United States Patent
Leroy et al.

(10) Patent No.: US 7,237,835 B2
(45) Date of Patent: Jul. 3, 2007

(54) ROOF MODULE OF A MOTOR VEHICLE ROOF

(75) Inventors: Alain Leroy, Diessen-Dettenschwang (DE); Arnold Schroetter, Wessling (DE); Rainier Wisuschil, Bruckmuehl (DE); Thomas Rudolph, Hechendorf (DE); Christian Steininger, Stockdorf (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 10/998,757

(22) Filed: Nov. 30, 2004

(65) Prior Publication Data

US 2005/0116511 A1    Jun. 2, 2005

(30) Foreign Application Priority Data

Nov. 30, 2003    (DE)    .................. 103 56 429

(51) Int. Cl.
    *B60J 7/00*    (2006.01)
(52) U.S. Cl. ................. 296/216.01; 296/216.08; 296/193.04; 224/316
(58) Field of Classification Search ........... 296/193.04, 296/216.01, 216.08; 224/316
    See application file for complete search history.

(56) References Cited

U.S. PATENT DOCUMENTS

| 4,159,144 | A |   | 6/1979  | Ehlen et al. |
|-----------|---|---|---------|--------------|
| 4,671,565 | A | * | 6/1987  | Grimm et al. ......... 296/216.04 |
| 5,048,890 | A | * | 9/1991  | Masuda ................. 296/216.08 |
| 5,104,178 | A | * | 4/1992  | Bienert ................. 296/216.08 |
| 5,540,478 | A | * | 7/1996  | Schuch ....................... 296/210 |
| 6,158,803 | A |   | 12/2000 | Reihl et al. |
| 6,340,204 | B1|   | 1/2002  | Seifert |
| 6,423,894 | B1| * | 7/2002  | Patz et al. ................. 136/244 |

FOREIGN PATENT DOCUMENTS

| DE | 2053086       | * | 6/1971  |
|----|---------------|---|---------|
| DE | 34 29 880 A1  |   | 2/1986  |
| DE | 92 07 442.1 U1|   | 8/1992  |
| FR | 2 669 589 A1  |   | 5/1992  |
| WO | WO 01/94141 A1|   | 12/2001 |

* cited by examiner

*Primary Examiner*—Dennis H. Pedder
(74) *Attorney, Agent, or Firm*—David S. Safran

(57) ABSTRACT

A roof module (10) of a motor vehicle roof (2), especially of a passenger car (1), which is mounted on a fixed body structure and which forms the top of the motor vehicle roof (2), to increase utility, the roof module is provided with guide rails (18) for movable attachment of at least one roof module component (17, 23, 26).

20 Claims, 1 Drawing Sheet

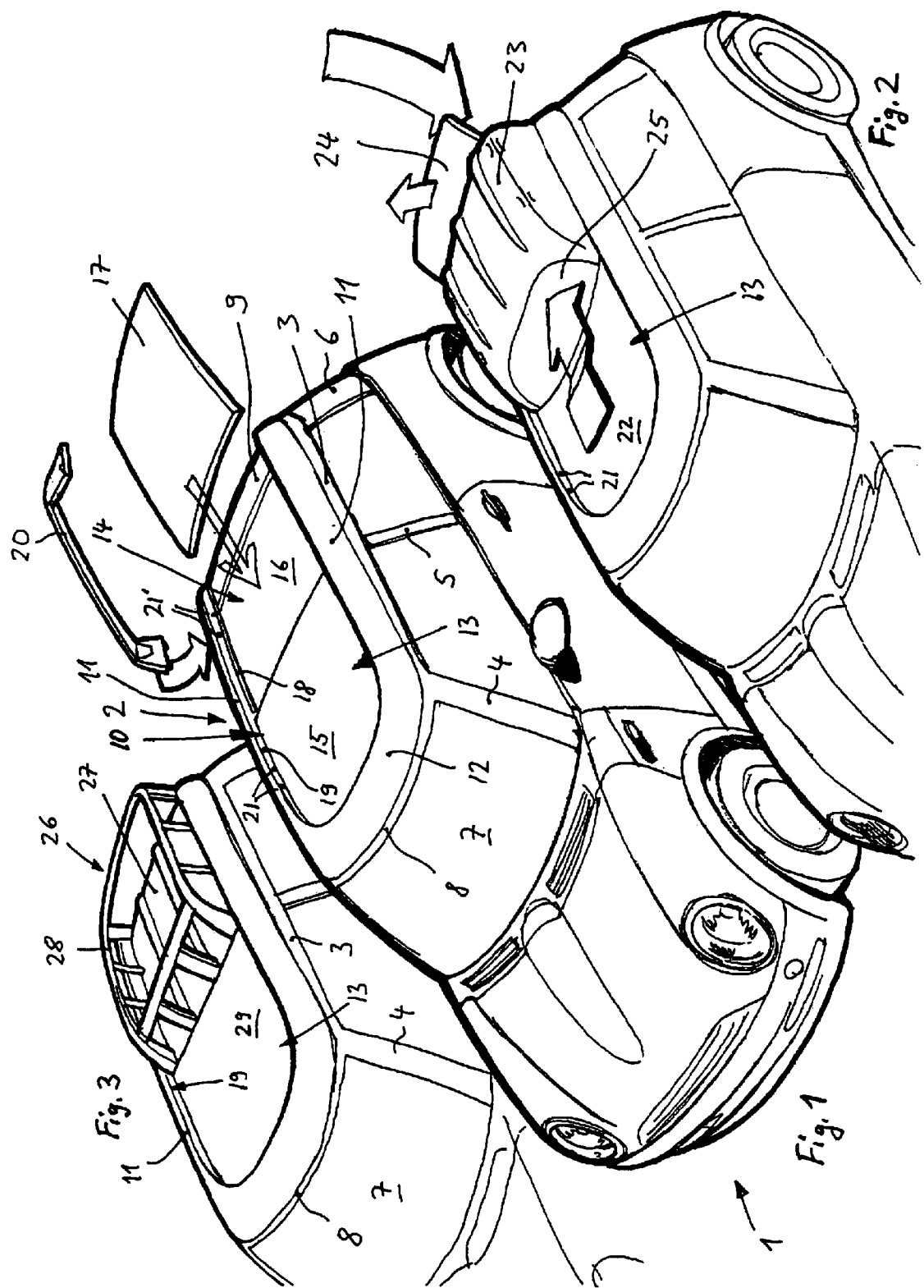

ROOF MODULE OF A MOTOR VEHICLE ROOF

BACKGROUND OF THE INVENTION

1. Field of the Invention

The invention relates to a roof module of a motor vehicle roof, especially of a passenger car, which is mounted on a fixed body structure and which forms the top of the motor vehicle roof.

2. Description of Related Art

German Patent Application DE 199 19 505 A1 and corresponds to U.S. Pat. No. 6,340,204, disclose a motor vehicle roof with a roof module which, as a pre-mounted unit for attachment to the two lateral lengthwise roof members, is pushed in from the front or from the back on the lengthwise roof members and is attached securely thereto, thus securely closing the roof opening. A subsequently variable configuration or use of the motor vehicle roof is neither intended nor possible here.

German Patent Application DE 34 29 880 A1 discloses a roof for motor vehicles which is formed as a premounted assembly or roof module and which can be detachably connected to the body from its interior by means of quick-acting or snap closures. The entire roof module can be provided in different configurations which can be removed in their entirety from the body and can be replaced by one another.

SUMMARY OF THE INVENTION

A primary object of the present invention is to devise roof module of the the initially mentioned type which offers a versatile utilization potential.

This object is achieved in accordance with the invention by the roof module having guide rails for movable attachment of at least one roof module component. By means of the guide rails or in general sliding guides, one roof module component can be easily replaced by a differently configured roof module component, the roof components having the same basic structure for accommodation on the guides. The guides can extend in the lengthwise direction of the roof or of the roof module or also in the transverse direction over part of the roof module or over its entire length so that a roof module component can be pushed in from the front, from the back or from the side, on the roof module.

Preferably, two guide rails are spaced opposite one another on the roof module in a lengthwise or transverse alignment, and the respective roof module component extends between them.

The object is also achieved in the roof module of a motor vehicle roof, especially of a passenger car, which is mounted on a fixed body structure and forms the top of the motor vehicle roof, in that the roof module has a receiving means for pushing in an interchangeable roof module component from the rear side. Pushing in from the rear facilitates the replacement of roof module components especially in a station wagon or a squareback.

If the roof module has two outer side edge areas which are formed to be elevated relative to an interposed middle part, and each has an inner flank, the guide rails can be located on these inner flanks. Thus, a part which projects up over the roof skin for a bearing means is not necessary. When the roof module component is held on the guides, it largely covers the guides.

A roof module in accordance with the invention is explained in detail with reference to the embodiments shown in the accompanying drawings.

BRIEF DESCRIPTION OF THE DRAWINGS

FIG. 1 is a perspective plan view a motor vehicle roof with a roof module and roof module components which can be detachably fixed thereto;

FIG. 2 shows in a perspective plan view the motor vehicle roof with the roof module of a second embodiment; and FIG. 3 is a perspective plan view the motor vehicle roof with the roof module of a third embodiment.

DETAILED DESCRIPTION OF THE INVENTION

A passenger car 1 contains a motor vehicle roof 2 with a fixed roof structure with respective lateral lengthwise roof members 3, which is connected laterally to roof pillars (A-pillar 4, B-pillar 5 and C-pillar 6 and optionally for a longer motor vehicle also to a D-pillar), on the front to an apron 8 which borders the windshield 7 at the top, and in the rear to a rear transverse roof member 9. The top of the motor vehicle roof 2 is formed by a roof module 10 which is securely mounted on the lengthwise roof members 3, the apron 8 and the transverse roof member 9. The outside of the roof module 10 has two oblong side roof areas 11 which are connected to one another in the front above the apron 8 by the front roof area 12 and form a U-shape which is opened to the rear with the latter.

Between the two oblong side roof areas 11, the roof module contains a front working section 13 and a rear working section 14. The front working section 13 which borders the front roof area 12, either directly or indirectly with the interposition of another component, such as a wind guiding means (not shown), and contains, for example, a cover 15 of an externally guided sliding roof which selectively closes or clears the front roof module opening when it is pushed to the rear over the rear working section 14 by a guide means (not shown) which is located on the side roof areas 11. Such an externally guided sliding roof (ASD) is disclosed, for example, in U.S. Pat. No. 6,158,803, which is hereby incorporated by reference.

The rear working section 14 is, for example, a fixed surface which is formed integrally with the roof module or is formed by an independent component and can be moved to the rear over the front cover 15. On the other hand, the rear working section 14 can also have a rear roof module opening 16 which extends between the side roof areas 11 and in front of the rear transverse roof member 9 and which can be closed by means of a roof module component which is formed, for example, by a transparent rear cover 17.

The rear cover 17 can be detachably and interchangeably mounted on the roof module 10 by a bearing and guide means which has a guide rail 18 which runs in the lengthwise direction of the roof on each side roof area 11. The side roof areas 11 are formed to be elevated in the manner of a frame relative to the interposed middle part of the roof module 10 and have inner flanks 19 which face one another and on which the guide rails 18 are arranged, such that the rear cover 17 which is accommodated thereon can be pushed-in in a forward direction over the rear transverse roof member 9 (see, FIG. 1). In its closed position in which the cover 17 closes the roof module opening 16, the cover 17 is sealed at its lateral edges by a sealing means (not shown).

Each side roof area 11 on its inner flank 19 above the guide rail 18 has at least one bearing receiver for fixing a load carrier 20 which extends transversely over the roof module 10. In the embodiment shown in FIG. 1 each side roof area 11 contains a front bearing receiver 21 for fixing a load carrier over the front working section 13 and a rear bearing receiver 21' for fixing the load carrier 20 over the rear working section 14. The two bearing receivers 21 and 21' on the right side roof area 11 are shown for example schematically as two cylindrical depressions at a time for accommodating the projecting bearing journals of the load carrier (e.g., roof rack) 20, but can also have a different configuration. Fundamentally, supporting the load carrier 20 on the vehicle roof 2 or on the roof module 10 can take place on other supports such as, for example, on additional guide rails which are located above the guide rails 18 for the rear cover 17 or the rear roof module component on the side roof areas 11.

In the embodiment shown in FIG. 2, the front working section 13 contains an internally running sliding roof with a movable cover 22 which is guided for movement into its rear open position on guide rails (not shown) which are located on the two side roof areas 11 or inner flanks 19 underneath the two guide rails 18 for the rear roof module component. The cover 22 of the internally running sliding roof is first lowered when opening by a bearing means and is then pushed on the guide rails to the rear to under the rear roof module component.

Here, the rear roof module component is either a cover 17 according to FIG. 1 or a cargo box 23 according to FIG. 2. The cargo box 23 has a closed bottom with a flat bottom part having side guide elements for engaging the guide rails 18. The cargo box 23 has, for example, a rear flap 24 for closing a rear loading opening or its entire top part can be swung around one or more front or lateral pivot joint(s) relative to the bottom part in order to be able to load or unload it. At least one partial area such as, for example, the front side 25 of the cargo box 23 can be made transparent so that ambient light can illuminate the interior of the cargo box 23. When the bottom part of the cargo box 23 likewise has at least one front transparent section, light can enter the vehicle interior via the unloaded or only partially loaded cargo box 23. The cargo box is made, for example, of plastic such as, for example, GFK with a transparent insert or of polycarbonate which, if necessary, is made transparent or at least translucent in an area.

Instead of the cargo box 23 or the cover 17, as another rear roof module component, a baggage carrier 26 (see, FIG. 3) can also be pushed in on the guides 18 of the roof module 10 and fixed, for example, by catches or by screws. The baggage carrier 26 contains a fixed bottom plate 27 with side guide elements for engaging the guide rails 18 and a carrier superstructure 28, for example, in the manner of a rail with support rungs on which the cargo can be secured with tightening straps or tensioning belts.

The front working section 13, instead of the internally running sliding roof with the movable cover 22, can also have a permanently installed plate 29 which is especially transparent and is made, for example, of plastic.

According to another embodiment, the roof module 10, as the front working section, contains an integrally formed front fixed surface or plate. The surface or plate or each front roof module component, at its front edge, is located preferably flush with the front roof area 12 of the roof module 10. The two side roof areas 11 are formed elevated following the front roof area 12 so that the resulting inner flanks 19 are available for holding the guides 18 and the supports for load carriers.

An important configuration feature of this roof module 10 is thus the two side roof areas 11 which are elevated relative to the middle part and which have internal flanks which are designed for holding the bearings and guides for roof module components which can be detachably mounted on the roof module and if necessary replaced, such as fixed or movable covers or load carrying means.

The roof module 10 is made especially of plastic, such as polycarbonate or LFI (long fiber injection) material, which can be provided with a cover film. When manufactured, for example, from polycarbonate in a mold tool, the desired shapes of the roof module 10, as well as the inner flanks 19 of the roof side areas 11, can be easily produced.

The roof module 10 can be either permanently cemented to the fixed roof structure or detachably fixed, for example, by means of a tension or screw means.

In another configuration which is not shown, the roof module contains a flat insertion part which can close the roof module opening and which extends over the entire length of the roof side area. The insertion part, which is preferably produced from plastic, such as polycarbonate, is enameled, for example, in the color of the motor vehicle or it contains at least one transparent section. A tail light and/or brake lights can be mounted on the insertion part, as generally on each rear roof module component.

The rear cover for the rear working section 14 can also be formed such that it can be swung up around its front edge which is supported on the roof module. Thus, the rear vehicle interior can be loaded via the roof module opening which is cleared in doing so. In general, the rear cover can be formed as part of a raisable elevated roof or spoiler roof so that the cover on its rear edge can be swung up into an ventilation position.

The externally guided sliding roof with the front cover 15 as well as the internally running sliding roof with the cover 22 can each constitute structural and working units which are interchangeably mounted on the roof module 10 or at least can be used as prepared mounting units in the manufacture of the roof module.

When the roof structure is formed without a rear transverse roof member 9, and the side roof areas 11 are mounted on the rear on the C-pillars, after opening the rear cover, or in general after removing the rear roof module component, and optionally, when the rear opening has been cleared, the rear area of the vehicle interior can be used as a cargo space which is upwardly open.

What is claimed is:

1. Roof module of a motor vehicle roof which is mounted on a fixed body structure and which forms the top of the motor vehicle roof, wherein the roof module comprises guide rails for movable attachment of at least one roof module component; wherein the roof module comprises two outer side edge areas that are connected to a front area to form a U-shaped part that is open to the rear and has an open middle part in a rear working section which extends between the two outer side edge areas, surfaces of the side edge areas laterally bordering the open middle part forming facing inner flanks on each of which a respective one of the guide rails is located and wherein a front cover is fixed, recessed between the outer side edge areas at the height of said guide rails in a front working section of the roof module, said at least one roof module component being receivable in said guide rails in the rear working section of the roof module.

2. Roof module as claimed in claim 1, wherein said guide rails comprise two opposed guide rails which extend on the roof module in a lengthwise direction thereof.

3. Roof module as claimed in claim 1, wherein the outer side edge areas are elevated relative to an interposed middle part.

4. Roof module as claimed in claim 1, wherein the roof module component is one of a plurality of different parts which are interchangeably mountable on the roof module.

5. Roof module as claimed in claim 4, wherein the plurality of different parts comprise a cover, a closed cargo box and an open carrier.

6. Roof module as claimed in claim 1, wherein the roof module component covers a one of the working sections which has a roof module opening.

7. Roof module as claimed in claim 1, wherein the roof module is mounted on roof members of the fixed body structure.

8. Roof module as claimed in claim 1, wherein the roof module is mounted on lateral lengthwise roof members, on a front roof apron and on a rear transverse roof member.

9. Roof module as claimed in claim 1, wherein the front working section of the roof module is an openable roof part.

10. Roof module as claimed in claim 1, further comprising additional mounting receivers for load carriers.

11. Roof module of a motor vehicle roof which is mounted on a fixed body structure and which forms the top of the motor vehicle roof, wherein the roof module comprises a receiving means with guide rails for receiving an interchangeable roof module component which is pushed-in from a rear end of the module and first bearing receivers for exchangeable load carriers disposed above said guide rails; wherein the roof module has an open middle part which extends between two outer side edge areas, surfaces of the side edge areas laterally bordering the open middle part forming facing inner flanks on each of which a respective one of the guide rails and respective first bearing receivers are located and wherein a front cover is mounted in said middle part in a front working area of the roof module and second bearing receivers for exchangeable load carriers are disposed above said front cover, and wherein the interchangeable roof module component is receivable in said guide rails below said first bearing receivers in a rear working area of the roof module.

12. Roof module as claimed in claim 11, wherein said guide rails comprise two opposed guide rails which extend on the roof module in a lengthwise direction thereof.

13. Roof module as claimed in claim 11, wherein the outer side edge areas are elevated relative to an interposed middle part.

14. Roof module as claimed in claim 11, wherein the roof module component is one of a plurality of different parts which are interchangeably mountable on the roof module.

15. Roof module as claimed in claim 14, wherein the plurality of different parts comprise a cover, a closed cargo box and an open carrier.

16. Roof module as claimed in claim 11, wherein the roof module has two outer side edge areas and an inside area which lies between the edge areas and wherein the inside area is divided at least into a front working section and a rear working section.

17. Roof module as claimed in claim 16, wherein the roof module component covers a one of the working sections which has a roof module opening.

18. Roof module as claimed in claim 11, wherein the roof module is mounted on roof members of the fixed body structure.

19. Roof module as claimed in claim 11, wherein the roof module is mounted on lateral lengthwise roof members, on a front roof apron and on a rear transverse roof member.

20. Roof module as claimed in claim 16, wherein the front working section of the roof module is an openable roof part.

* * * * *